(12) United States Patent
Visscher et al.

(10) Patent No.: US 10,523,985 B2
(45) Date of Patent: Dec. 31, 2019

(54) MANAGING DEEP AND SHALLOW BUFFERS IN A THIN-CLIENT DEVICE OF A DIGITAL MEDIA DISTRIBUTION NETWORK

(71) Applicant: ACTIVEVIDEO NETWORKS, INC., San Jose, CA (US)

(72) Inventors: Bert Visscher, Hilversum (NL); Gerrit Hiddink, Amersfoort (NL); Maarten Hoeben, Amersfoort (NL)

(73) Assignee: ACTIVEVIDEO NETWORKS, INC., San Jose, CA (US)

(*) Notice: Subject to any disclaimer, the term of this patent is extended or adjusted under 35 U.S.C. 154(b) by 0 days.

(21) Appl. No.: 15/368,527

(22) Filed: Dec. 2, 2016

(65) Prior Publication Data
US 2017/0085928 A1    Mar. 23, 2017

Related U.S. Application Data (63) Continuation-in-part of application No. 14/757,935, filed on Dec. 23, 2015, now Pat. No. 10,264,293.
(Continued)

(51) Int. Cl.
*H04N 21/2389* (2011.01)
*H04N 21/431* (2011.01)
(Continued)

(52) U.S. Cl.
CPC ..... *H04N 21/23892* (2013.01); *H04N 21/234* (2013.01); *H04N 21/23406* (2013.01);
(Continued)

(58) Field of Classification Search
None
See application file for complete search history.

(56) References Cited

U.S. PATENT DOCUMENTS 5,642,498 A * 6/1997 Kutner ................. G09G 5/393
345/536
6,539,545 B1    3/2003 Dureau et al.
(Continued)

FOREIGN PATENT DOCUMENTS

WO    WO01/56293 A1    8/2001

OTHER PUBLICATIONS

ActiveVideo Networks, Inc., International Search Report and Written Opinion, PCT/US2016/064972, dated Feb. 17, 2017, 9 pgs.
(Continued)

*Primary Examiner* — Jason K Lin
(74) *Attorney, Agent, or Firm* — Morgan, Lewis & Bockius LLP (57) ABSTRACT

A client device receives, from a server, first content directed to a first buffer in the client device and second content directed to a second buffer in the client device. The second buffer is deeper than the first buffer. The client device buffers the first content in the first buffer and buffers the second content in the second buffer. At least a portion of the second content is buffered in the second buffer simultaneously with buffering the first content in the first buffer. The client device selects between the first content in the first buffer and the second content in the second buffer, and provides the selected content for display.

18 Claims, 10 Drawing Sheets

Related U.S. Application Data (60) Provisional application No. 62/263,551, filed on Dec. 4, 2015, provisional application No. 62/096,790, filed on Dec. 24, 2014.

(51) Int. Cl.

| | | |
|---|---|---|
| *H04N 21/236* | (2011.01) | |
| *H04N 21/2343* | (2011.01) | |
| *H04N 21/234* | (2011.01) | |
| *H04N 21/44* | (2011.01) | |
| *H04N 21/845* | (2011.01) | |
| *H04N 21/482* | (2011.01) | |
| *H04N 21/637* | (2011.01) | |
| *H04N 21/462* | (2011.01) | |

(52) U.S. Cl.
CPC ............ *H04N 21/23614* (2013.01); *H04N 21/234309* (2013.01); *H04N 21/4316* (2013.01); *H04N 21/44* (2013.01); *H04N 21/44004* (2013.01); *H04N 21/4622* (2013.01); *H04N 21/4821* (2013.01); *H04N 21/637* (2013.01); *H04N 21/8455* (2013.01)

(56) References Cited

U.S. PATENT DOCUMENTS

| | | | |
|---|---|---|---|
| 6,850,490 B1 | 2/2005 | Woo et al. | |
| 7,774,521 B2* | 8/2010 | Gupta | G06F 13/102 710/54 |
| 8,781,240 B2 | 7/2014 | Srinivasan et al. | |
| 9,204,113 B1 | 12/2015 | Kwok et al. | |
| 9,226,018 B1* | 12/2015 | Filippov | H04N 21/4331 |
| 9,621,926 B1 | 4/2017 | Lee et al. | |
| 9,635,440 B2 | 4/2017 | Lacroix | |
| 2002/0116705 A1* | 8/2002 | Perlman | H04N 5/4401 725/31 |
| 2004/0111526 A1 | 6/2004 | Baldwin et al. | |
| 2005/0034155 A1 | 2/2005 | Gordon et al. | |
| 2007/0266412 A1 | 11/2007 | Trowbridge et al. | |
| 2008/0109556 A1* | 5/2008 | Karlberg | H04N 7/163 709/231 |
| 2008/0172441 A1* | 7/2008 | Speicher | H04L 12/2838 709/201 |
| 2008/0232243 A1* | 9/2008 | Oren | H04N 21/631 370/216 |
| 2009/0172431 A1* | 7/2009 | Gupta | G06F 13/102 713/320 |
| 2009/0183197 A1* | 7/2009 | Matthews | H04N 21/23424 725/32 |
| 2009/0265746 A1* | 10/2009 | Halen | H04L 29/06027 725/109 |
| 2010/0054268 A1 | 3/2010 | Divivier | |
| 2010/0158109 A1* | 6/2010 | Dahlby | H04N 7/17318 375/240.03 |
| 2011/0161517 A1* | 6/2011 | Ferguson | H04N 7/17318 709/231 |
| 2011/0211591 A1 | 9/2011 | Traub et al. | |
| 2012/0216232 A1 | 8/2012 | Chen et al. | |
| 2012/0271920 A1* | 10/2012 | Isaksson | H04L 47/2416 709/219 |
| 2012/0297081 A1* | 11/2012 | Karlsson | H04L 65/4084 709/231 |
| 2013/0042271 A1* | 2/2013 | Yellin | H04N 5/765 725/41 |
| 2013/0276015 A1* | 10/2013 | Rothschild | H04N 21/2387 725/25 |
| 2013/0297887 A1* | 11/2013 | Woodward | G06F 17/30132 711/137 |
| 2014/0089469 A1* | 3/2014 | Ramamurthy | H04L 65/60 709/219 |
| 2014/0111526 A1 | 4/2014 | Asaka | |
| 2014/0168515 A1* | 6/2014 | Sagliocco | G06T 1/0071 348/515 |
| 2014/0223307 A1 | 8/2014 | McIntosh et al. | |
| 2014/0223482 A1 | 8/2014 | McIntosh et al. | |
| 2014/0289627 A1 | 9/2014 | Brockmann et al. | |
| 2015/0023372 A1* | 1/2015 | Boatright | H04L 12/4633 370/474 |
| 2015/0037011 A1 | 2/2015 | Hubner et al. | |
| 2015/0135209 A1* | 5/2015 | LaBosco | H04N 21/43635 725/31 |
| 2015/0139603 A1 | 5/2015 | Silverstein et al. | |
| 2015/0195525 A1 | 7/2015 | Sullivan et al. | |
| 2016/0050069 A1 | 2/2016 | Griffin et al. | |
| 2016/0119624 A1 | 4/2016 | Frishman | |

OTHER PUBLICATIONS

ActiveVideo Networks, Inc., International Search Report and Written Opinion, PCTUS2015/000502, dated May 6, 2016, 8 pgs.
ActiveVideo Networks, Inc., International Preliminary Report on Patentability, PCTUS2015/000502, dated Jun. 27, 2017, 5 pgs.
ActiveVideo Networks, Inc., International Preliminary Report on Patentability, PCT/US2016/064972, dated Jun. 5, 2018, 7 pgs.
Hoeben, Office Action, U.S. Appl. No. 14/757,935, dated Sep. 23, 2016, 29 pgs.
Hoeben, Final Office Action, U.S. Appl. No. 14/757,935, dated Apr. 12, 2017, 30 pgs.
Hoeben, Office Action, U.S. Appl. No. 14/757,935, dated Aug. 28, 2017, 32 pgs.
Hoeben, Final Office Action, U.S. Appl. No. 14/757,935, dated Feb. 28, 2018, 34 pgs.
Hoeben, Office Action, U.S. Appl. No. 14/757,935, dated Jun. 28, 2018, 37 pgs.
ActiveVideo Networks, Inc., Extended European Search Report, EP15873840.1, dated May 18, 2018, 9 pgs.
ActiveVideo Networks, Inc., Communication Pursuant to Rules 70(2) and 70a(2), EP15873840.1, dated Jun. 6, 2018, 1 pg.
Hoeben, Notice of Allowance, U.S. Appl. No. 14/757,935, Jan. 28, 2019, 9 pgs.

* cited by examiner

MANAGING DEEP AND SHALLOW BUFFERS IN A THIN-CLIENT DEVICE OF A DIGITAL MEDIA DISTRIBUTION NETWORK

RELATED APPLICATIONS

This application claims priority to U.S. Provisional Patent Application No. 62/263,551, filed Dec. 4, 2015, which is incorporated herein by reference in its entirety. This application is also a continuation-in-part of U.S. patent application Ser. No. 14/757,935, filed Dec. 23, 2015, which claims priority to U.S. Provisional Patent Application No. 62/096,790, filed Dec. 24, 2014, both of which are incorporated herein by reference in their entirety.

TECHNICAL FIELD

This relates generally to interactive television, including but not limited to buffering video and user-interface elements for an interactive television service.

BACKGROUND

The increasing use of cloud-based computer services has seen the growth of remote application servers (i.e., interactive television servers) that communicate with remote client devices. End-users may interact with a software application executing on a remote application server by interacting with a graphics display created on the user's remote client device. The user's commands (e.g., keyboard, mouse, gesture, and/or remote-control commands) are relayed back to the remote application server. However, the implementation of this paradigm involves more than simply establishing a low-latency (i.e., low-delay) link between a screen, its control devices (e.g., a client device), and a remote application server, as can be seen by considered the role of buffers in such systems.

Buffer size affects many aspects of a data communication system. For example, a typical first-in, first-out (FIFO) buffer of short length will result in a shorter delay on the data emerging from the output of the buffer than a buffer of greater length. This shorter delay, also known as lower latency, is beneficial to displaying interactive content on a screen with which a user is actively interacting. Conversely, a longer buffer is beneficial for receiving continuously playing multimedia content when the immediate start of the content is not essential to maintaining a high-quality user experience. Because of the long length of the buffer, fewer individual transmissions need to be made by the remote application server, reducing the server's workload. Conversely, the higher latency of a longer buffer can degrade the user's perception of the interactive experience.

If the user were simply interacting with a static menu image on a display screen connected to a client device, a single short buffer would be best. Conversely, if the user were simply watching a video program with no interaction, a long buffer would maximize the efficiency of the system. However, modern interactive systems frequently combine both data types. For example, interactive menus with video presented in one or more windows are a common part of an interactive television user interface. Hence, there is a need to improve (e.g., optimize) how multiple data types are managed for an improved (e.g., optimal) user experience. Such an improved interactive system represents an unmet need for interactive television systems currently in service, whether the systems are traditional cable television systems or systems that deliver content via the Internet.

SUMMARY

A client device (e.g., a set-top box (STB)) located at a customer premises has multiple buffer types for managing delivery of media that have different characteristics when combined for presentation. The buffers operate as first-in, first-out (FIFO) queues for which the length of the buffer is directly proportional to the delay through the buffer. Hence, a shallow buffer will exhibit a low-latency for data arriving for display by an interactive television application. In some embodiments, the shallow buffer operates with a just-in-time paradigm that is enabled by the buffer's relatively shallow depth. The shallow buffer may be used to store certain interactive television content with elevated priority, which a remote application server quickly accesses, packages, and transmits to the client device. The low latency of the shallow buffer helps to ensure that such high-priority content is presented promptly.

Conversely, a deep buffer may store a larger amount (e.g., multiple seconds) of media data such as video. A deep buffer may be used for ahead-of-time storage (e.g., storing media data that is not yet scheduled for presentation), enabling the remote application server to send data to the deep buffer in a relatively large block, thus allowing fewer transmissions from the server and proportionally reducing the server's processing load.

The deep buffer is deep with respect to (i.e., is deeper than) the shallow buffer, and the shallow buffer is shallow with respect to (i.e., is shallower than) the deep buffer. In some embodiments, the deep buffer is deeper than the shallow buffer by at least one order of magnitude (i.e., one factor of ten), or by at least two orders of magnitude. In one example, the shallow buffer has a length (i.e., depth) of one megabyte (MB) and the deep buffer has a length of 64 MB. In another example, the shallow buffer has a length of 10 MB and the deep buffer has a length of 1 gigabyte (GB). Other examples are possible.

In an example of the use of two or more types of buffers on a client device, a system that includes the remote application server and the client device supports both user-interface-element delivery as well as video playback. The server is typically located in a distribution network's head-end and determines which of a plurality of available buffer lengths (and thus buffers) is appropriate for a display element that is about to be sent to the client device. In some embodiments, this determination is performed by a virtual set-top application running on the server. It is known to those skilled in the art that humans are more sensitive to latency in the response of user-interface elements such as, for example, virtual button detents or illuminations, than they are to the start of video sequences. This makes a shallow buffer optimal for user-interface elements in a responsive interactive menu application.

The system may also use a deep buffer for video content playback. A deep buffer, which is also called an ahead-of-time buffer, is more resilient to network disturbances since it accommodates momentary disturbances or disruptions in content delivery across a network. The deep buffer also reduces the number of transmissions from the server to the client device as compared to the shallow buffer, thus reducing server processing load. Another example of the utility of a deep buffer is for receiving content streaming from a third-party server that is not controlled by the operator of the interactive television system. A deep buffer may thus be used to receive a movie being delivered from a third-party (e.g., a service such as YouTube or Netflix).

In some embodiments, the combined use of long and short buffer lengths (i.e., of deep and shallow buffers) enables the system to repair damaged data packets. The server detects damaged data packets (e.g., Internet-delivered content packets) and replaces them by resending data packets to the shallow low-latency buffer. Software on the client device performs a real-time swap-out of the damaged packets with the replacements as the damaged packets emerge from the deep buffer prior to display. These embodiments are another example of just-in-time asset delivery.

Another advantage of using both deep and shallow buffers is to improve the responsiveness of the user interface being created on-screen by the client device (e.g., located at the customer premises). For example, by using a low-latency shallow buffer for graphical and/or audio components associated with the interactive manipulation of buttons or other on-screen user-interface elements, the "feel" of the interface and the user's interaction with it can be significantly enhanced.

Yet an additional example of the advantages of using both deep and shallow buffers is to enable the virtual set-top client, located in the server, to function as though all content and data available to the content provider from a remote server or other distant sources is promptly (e.g., immediately) available on the client device and hence to the end-user. This functionality is implemented by using the shallow buffer to provide just-in-time delivery and display of graphic and/or audio content data that is not available, or not yet available, from the deep buffer. Initial frames (e.g., of a preview of a program or an initial portion of a program) are transmitted to the shallow buffer and content backing up (i.e., following) the initial frames are simultaneously transmitted to the deep buffer to allow for instant streaming depending on choices made by the user within the interactive on-screen interface.

For example, a user chooses certain content (e.g., a movie), and promptly views a first portion of the content (e.g., the first thirty seconds) delivered via the shallow buffer. Because the first portion is buffered in the shallow buffer, the latency in the initial display of the requested content is low (e.g., no more than one-tenth of a second). Meanwhile, the server sends, in parallel, the same packets of audio and video data to the deep buffer. When the deep buffer fills, the client device switches from drawing from the shallow buffer to drawing from the deep buffer. The shallow buffer is thus freed up to buffer data for the viewer's next potential choice if the viewer then decides to look further rather than continuing to watch the initially chosen content.

In some embodiments, a method performed at a client device includes receiving, from a server, first content directed to a first buffer in the client device and second content directed to a second buffer in the client device. The second buffer is deeper than the first buffer. The method also includes buffering the first content in the first buffer and buffering the second content in the second buffer. At least a portion of the second content is buffered in the second buffer simultaneously with buffering the first content in the first buffer. The method further includes selecting between the first content in the first buffer and the second content in the second buffer, and providing the selected content for display.

In some embodiments, a client device includes one or more processors and memory storing one or more programs for execution by the one or more processors. The one or more programs include instructions for performing the above method. In some embodiments, a non-transitory computer-readable storage medium stores one or more programs configured for execution by one or more processors of a client device. The one or more programs include instructions for performing the above method.

In some embodiments, the server-side complement of the above method is performed by a server. In some embodiments, a server includes one or more processors and memory storing one or more programs for execution by the one or more processors. The one or more programs include instructions for performing the server-side complement of the above method. In some embodiments, a non-transitory computer-readable storage medium stores one or more programs configured for execution by one or more processors of a server. The one or more programs include instructions for performing the server-side complement of the above method.

The combined use of deep and shallow buffers thus produces a highly-responsive user experience for a wide variety of interactive television applications with content from sources within the delivery network or from remote servers across the Internet.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The combined use of deep and shallow buffers in a client device (e.g., set-top box) provides a consistently responsive interactive television experience to an end-user interacting with the client device.

In some embodiments, an interactive graphical user interface is generated for an interactive-television service. Both still-frame and embedded video objects (e.g., full-motion-video objects) are displayed in the user interface. Both the video and still-frame elements of the user interface are generated by a remote application server (e.g., at a central location, such as a headend). (The video and still-frame elements are both examples of user-interface elements.) Access to the remote application server is shared by a plurality of users interacting with the user interface through client devices from a plurality of distinct locations. The remote application server executes a user-interface application with which the users remotely interact. In some embodiments, a client device assists the server by providing functions that are local to the client, such as media overlay and/or compositing.

The shallow and deep buffers in a client device are independent buffers for receiving communications. The remote application server addresses each of the buffers independently. For example, interactive still-frame user-interface elements (e.g., on-screen menu choices and/or button detent graphics) are sent to the shallow buffer of a client device, and video and/or audio information are streamed to the deep buffer of the same client device. The client device may be provided with computer-executable instructions from the server for combining data from the deep and shallow buffers such that the user perceives a coherent single display of interactive information in an interface that combines the still-frame elements with the streaming elements. The combined interface will have the same user look and feel as if generated entirely from the server, but with reduced latency such that a user will perceive a more responsive user-interface experience.

Figure 1:
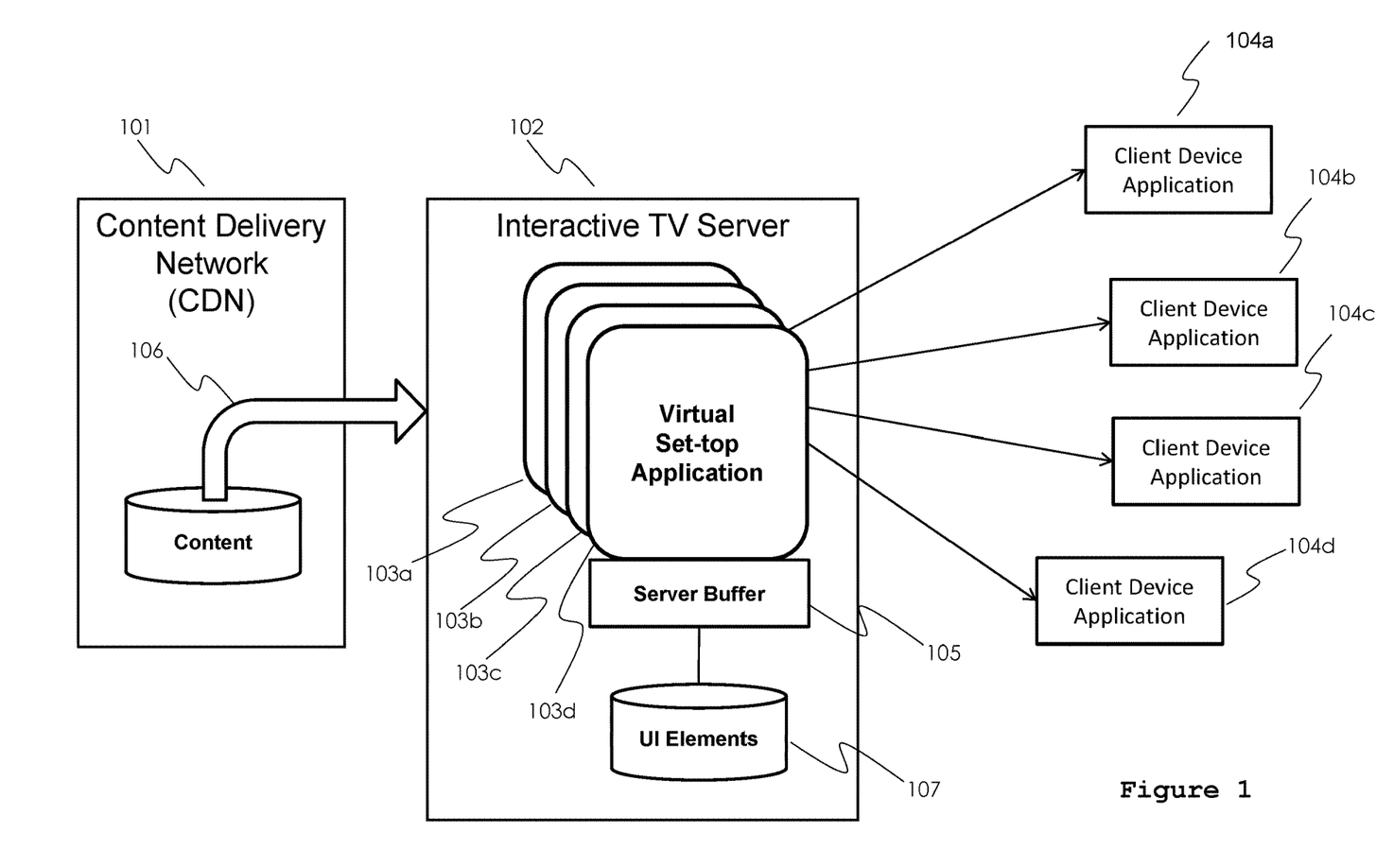
FIG. 1 is a block diagram of an interactive television server communicatively coupled with a content delivery network and a plurality of client-device applications executing in respective client devices, in accordance with some embodiments.

FIG. 1 is a block diagram of an interactive television (ITV) server 102 (i.e., a remote application server) communicatively coupled with a content delivery network (CDN) 101 and a plurality of client-device applications 104a-104d (i.e., client-side software applications) executing in respective client devices (e.g., set-top boxes), in accordance with some embodiments. The server 102 hosts virtual set-top applications 103a-103d, which are instances of a software application. Each of the virtual set-top applications 103a-103d corresponds to and is in communication with a respective one of the client-device applications 104a-104d. In some embodiments, the client devices are located at the respective users' premises. As the users interact with the system of FIG. 1, the client-device applications 104a-104d send user commands to the ITV server 102, which engages the respective users' virtual set-top applications 103a-103d. Each virtual set-top application 103 is responsive to user commands and sends commands and/or content to the corresponding client-device application 104. Content sent to a client-device application 104 is addressed to one of a plurality of communications buffers in the client device (e.g., to either shallow buffer 205 or deep buffer 206, FIG. 2).

In some embodiments, the server 102 is located at the headend of a network. A headend is a centralized location for housing servers and related communications equipment to serve a specific geographic region. The headend could be part of a cable TV network or purely an Internet-connected facility serving clients connected to the Internet.

The CDN 101 could be, by way of example, a cable television operator's network, the Internet, or a combination of the two. The CDN 101 conveys content 106 from a remote content server to the ITV server 102, where the content is stored in a server buffer 105 that is accessible to the virtual set-top applications 103a-103d. The server buffer 105 thus acts as a library of available content, including video and audio content. The server 102 also includes a database 107 of user-interface elements (e.g., graphical elements) accessible to the virtual set-top applications 103a-103d.

The information conveyed from the virtual set-top applications 103 to their respective client-device applications 104 includes a variety of multimedia elements with a variety of communications requirements. For example, if a user selects a menu item that is currently displayed via the client-device application 104, a command is transmitted to the server 102 and received by the respective virtual set-top application 103. The virtual set-top application 103 responds, for example, with a high-lighted menu-item graphic. For the user experience to be pleasant, the graphic should be sent and displayed in about two-tenths of a second or less. Otherwise the user will perceive a possibly annoying lag in the system with respect to that person's actions. The virtual set-top application 103 therefore directs the graphic to a shallow buffer in the client device. For another example of a different media type, the user selects a video (e.g., a feature film) to view. In response, the respective virtual set-top application 103 directs the video stream to a deep buffer in the client device, for network efficiency reasons. The deep buffer imposes a higher latency (i.e., longer wait time) than the shallow buffer before the video is displayed on the user's television screen from the client device. A longer wait-time may not be perceived as bothersome to the user, because established expectations for wait times associated with viewing video-on-demand content are not as demanding as for interactive menu-item graphics.

Figure 2:
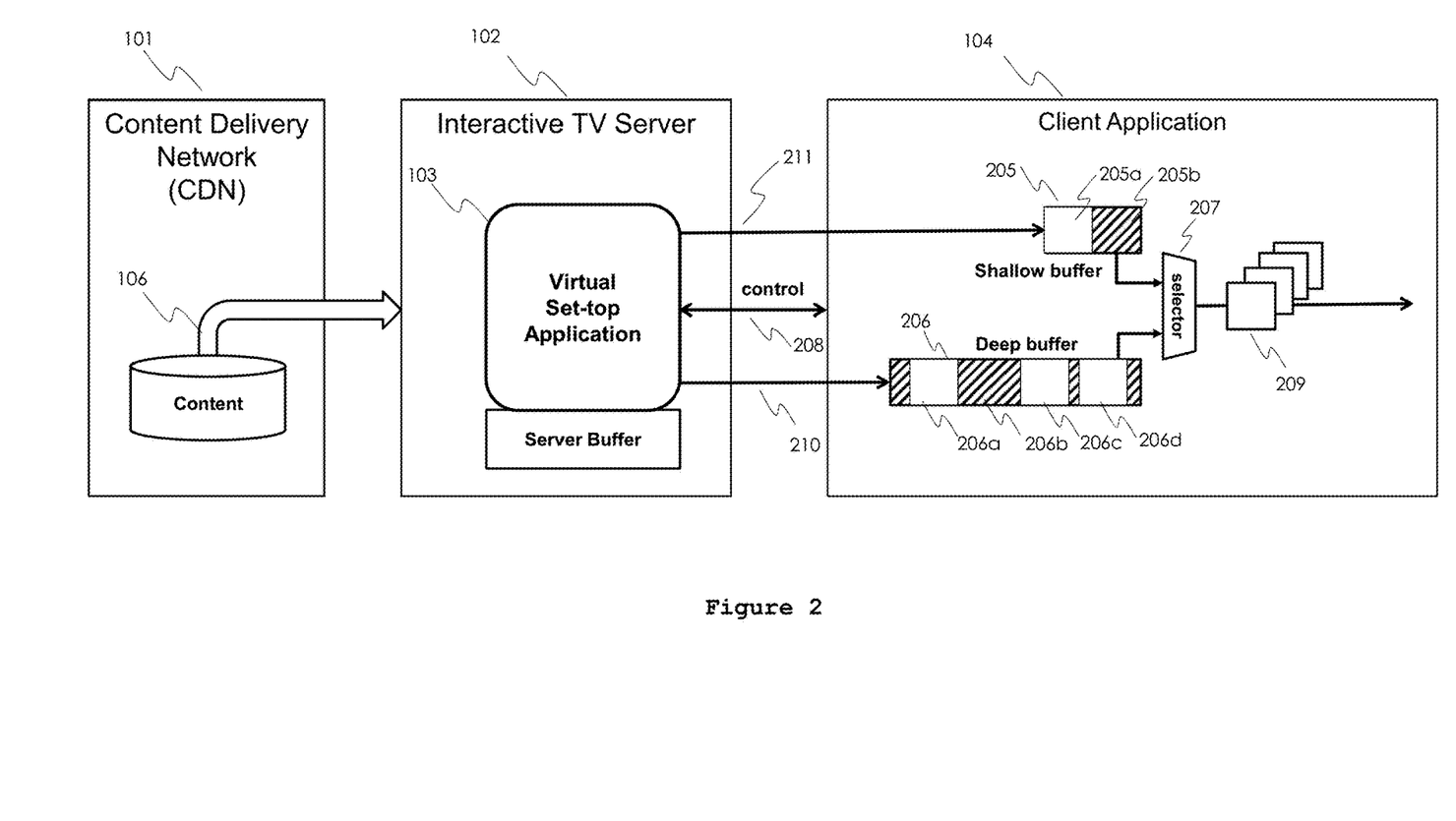
FIG. 2 is a block diagram of the system of FIG. 1 showing details of a client-device application in accordance with some embodiments.

FIG. 2 is a block diagram of the system of FIG. 1 showing details of a client-device application 104 in accordance with some embodiments. For simplicity, only single instances of a virtual set-top application 103 and client-device application 104 are shown in FIG. 2. The virtual set-top application 103 has multiple connections to the client-device application 104, which includes a shallow buffer 205 and a deep buffer 206. A connection 211 is used to communicate with the shallow buffer 205, conveying data packets 205a and 205b for buffering in the shallow buffer 205. A separate connection 210 is used to communicate with the deep buffer 206, conveying data packets 206a-206d for buffering in the deep buffer 206. The number of frames that the virtual set-top application 103 sends to the deep buffer 206 is typically greater than the number of frames it sends to the shallow buffer 205. The client-device application 104 also includes a buffer selector 207 (e.g., a multiplexer), which is directed by control instructions sent by the virtual set-top application 103 via yet another connection 208. The control instructions instruct the buffer selector 207 to draw data packets corresponding to frames from either or both of the buffers 205 and 206, and thus instruct the client-device application 104 to assemble video frames 209 from data packets drawn from either or both of the buffers 205 and 206.

Figure 3A:
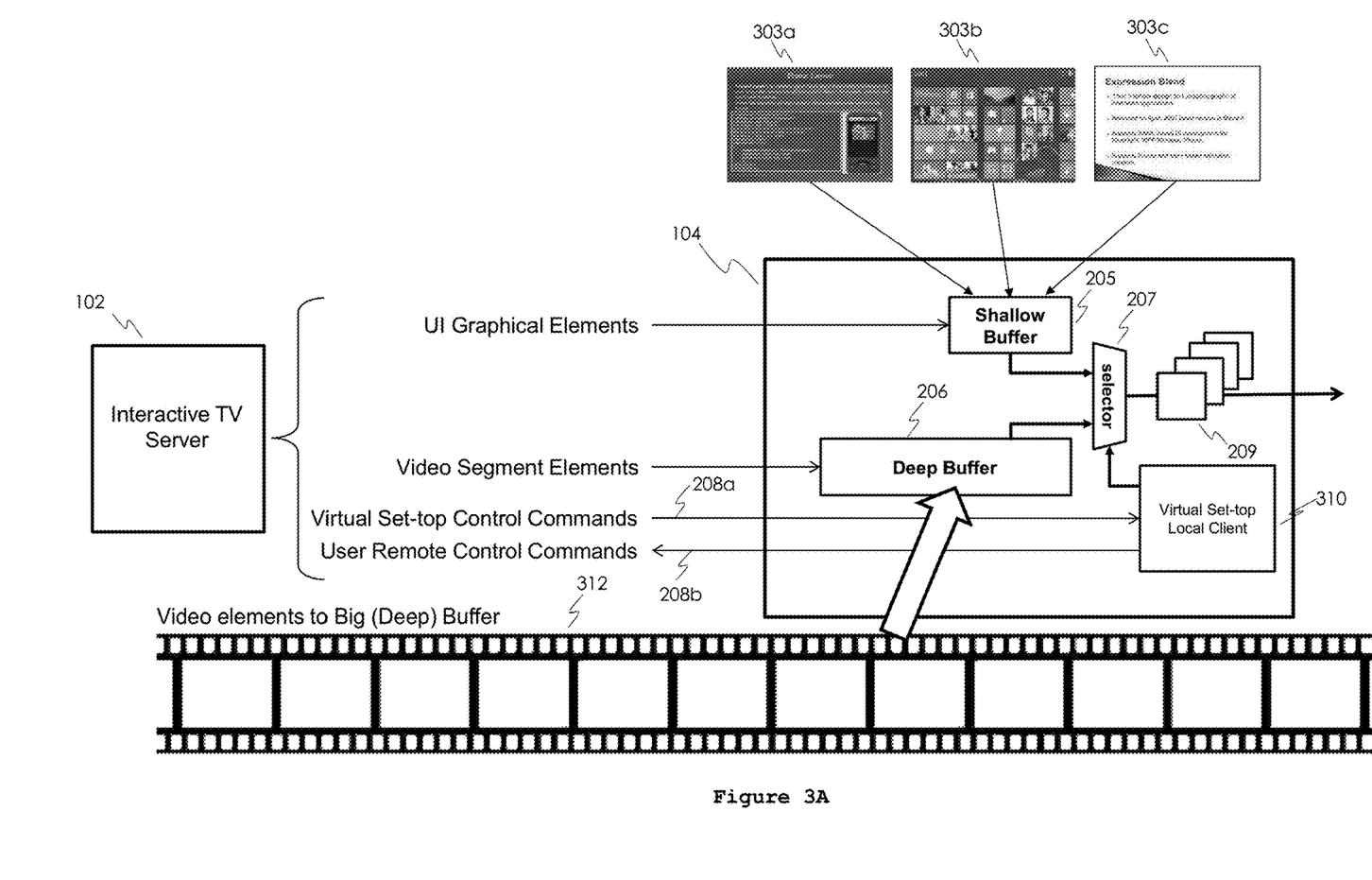
FIG. 3A is a block diagram showing additional details of a client-device application in accordance with some embodiments.

FIG. 3A is a block diagram showing additional details of a client-device application 104 in accordance with some embodiments. Details of the server 102 are omitted from FIG. 3A to focus on how different characteristics of deep and shallow buffers may facilitate efficient interactive content delivery from the server 102 to the client-device application 104. In this example, user-interface elements 303a to 303c (e.g., still-frame graphical elements) are stored in the shallow buffer 205, enabling them to be inserted into a sequence of frames by the buffer selector 207, and thus displayed, with low latency. The buffer selector 207 performs this insertion under the direction of control commands 208a from the server 102 (e.g., from a respective virtual set-top application 103) via the connection 208 (FIG. 2). In some embodiments, the server 102 sends the control commands 208a via the connection 208 to a virtual set-top local client 310, which is software running in the client-device application 104 and which controls the buffer selector 207. The virtual set-top local client 310 also sends control commands 208b via the connection 208 to the server 102 (e.g., to the respective virtual set-top application 103). The control commands 208b are based, for example, on user inputs.

The low latency for displaying the user-interface elements 303a to 303c provides a high-quality end-user experience because user inputs (e.g., gestures, button presses, or remote-control commands) are manifested on-screen in seemingly real-time. Meanwhile, longer contiguous data packets of content 312 (e.g., video segment elements representing video sequences) are stored in the deep buffer 206 to reduce the number of requests for content to the server 102, thus conserving system resources. The deep buffer 206 also smooths out irregularities in the network data delivery of lengthy content streams due to the sometimes-uncontrollable network congestion found in most data-distribution networks.

Figure 3B:
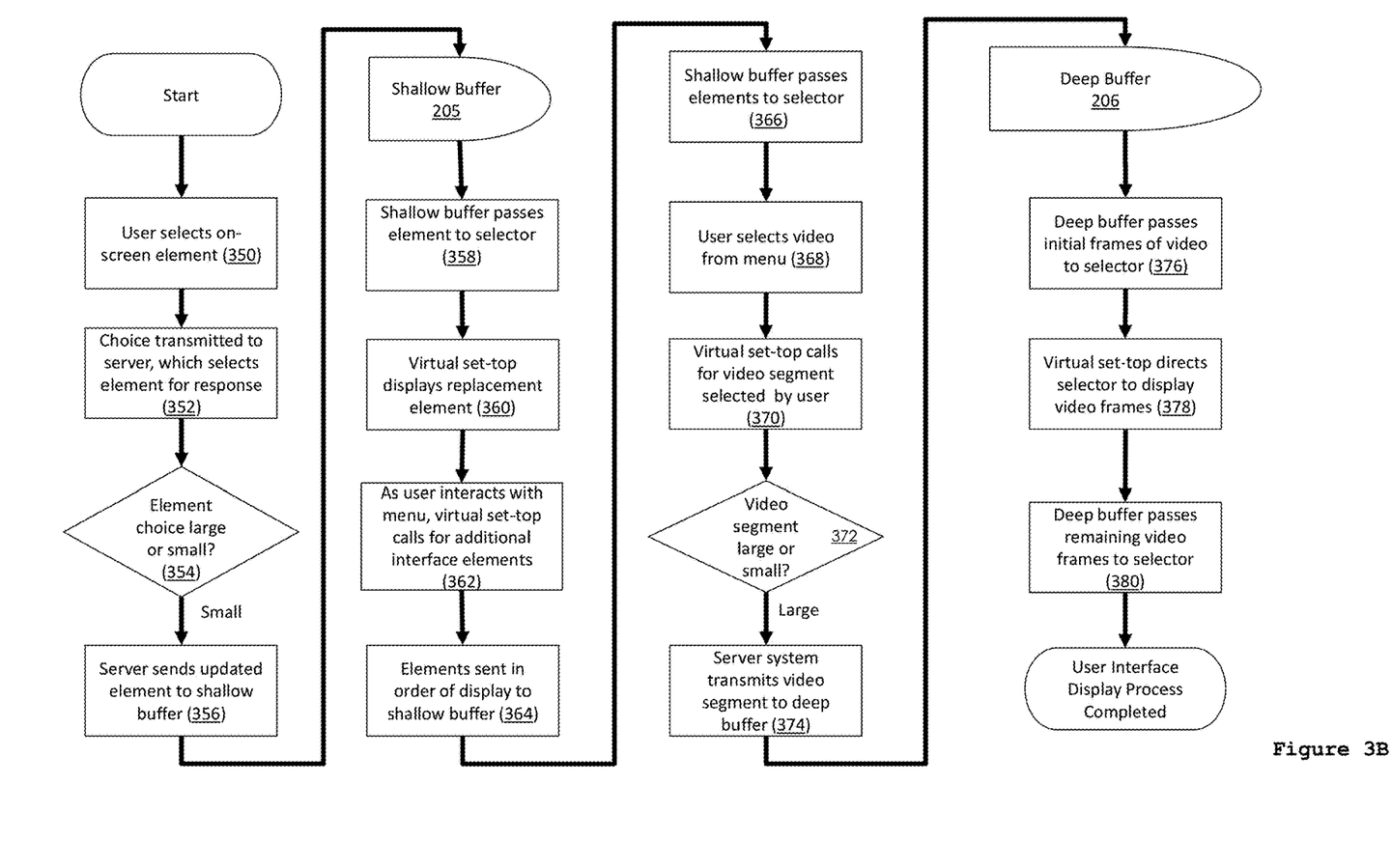
FIG. 3B is a flowchart of a method of operating the system of FIG. 3A in accordance with some embodiments.

FIG. 3B is a flowchart of a method of operating the system of FIG. 3A in accordance with some embodiments. In the method of FIG. 3B, the user of a client device selects (350) an on-screen user-interface element (e.g., a user-interface element 303a, 303b, or 303c, or a video). The user's selection is transmitted (352) to a respective virtual set-top application 103 in the server 102, which selects the user-interface element for inclusion in a response to the client device. The virtual set-top application 103 determines (354) whether the selected element satisfies a size threshold (e.g., whether it is large or small). If the selected element does not satisfy the size threshold, the virtual set-top application 103 sends (356) the selected element to the shallow buffer 205, which passes (358) the selected element to the buffer selector 207. The selected element is thus displayed (360) on a display associated with the client device. As the user views or interacts with the displayed menu that includes the selected element, the virtual set-top application 103 calls (362) for additional user-interface elements (e.g., from the server buffer 105 and/or database 107, FIG. 1) and sends (364) them to the shallow buffer 205. The shallow buffer 205 passes (366) these elements to the buffer selector 207 for display as appropriate.

The user selects (368) a video (e.g., a movie, movie preview, etc.) from the menu. In response, the virtual set-top application 103 calls (370) (e.g., to the server buffer 105 or to a remote server in the CDN 101) for a video segment of the video selected by the user. The virtual set-top application 103 determines (372) whether the video segment satisfies a size threshold (e.g., whether it is large or small). If the video segment is large, the virtual set-top application 103 transmits (374) the video segment to the deep buffer 206. The deep buffer 206 passes (376) initial frames of the video segment to the buffer selector 207, which is directed (378) by the virtual set-top application 103 to provide the initial frames for display. The deep buffer similarly passes (380) remaining frames of the video segment to the buffer selector 207 for display.

Figure 4A:
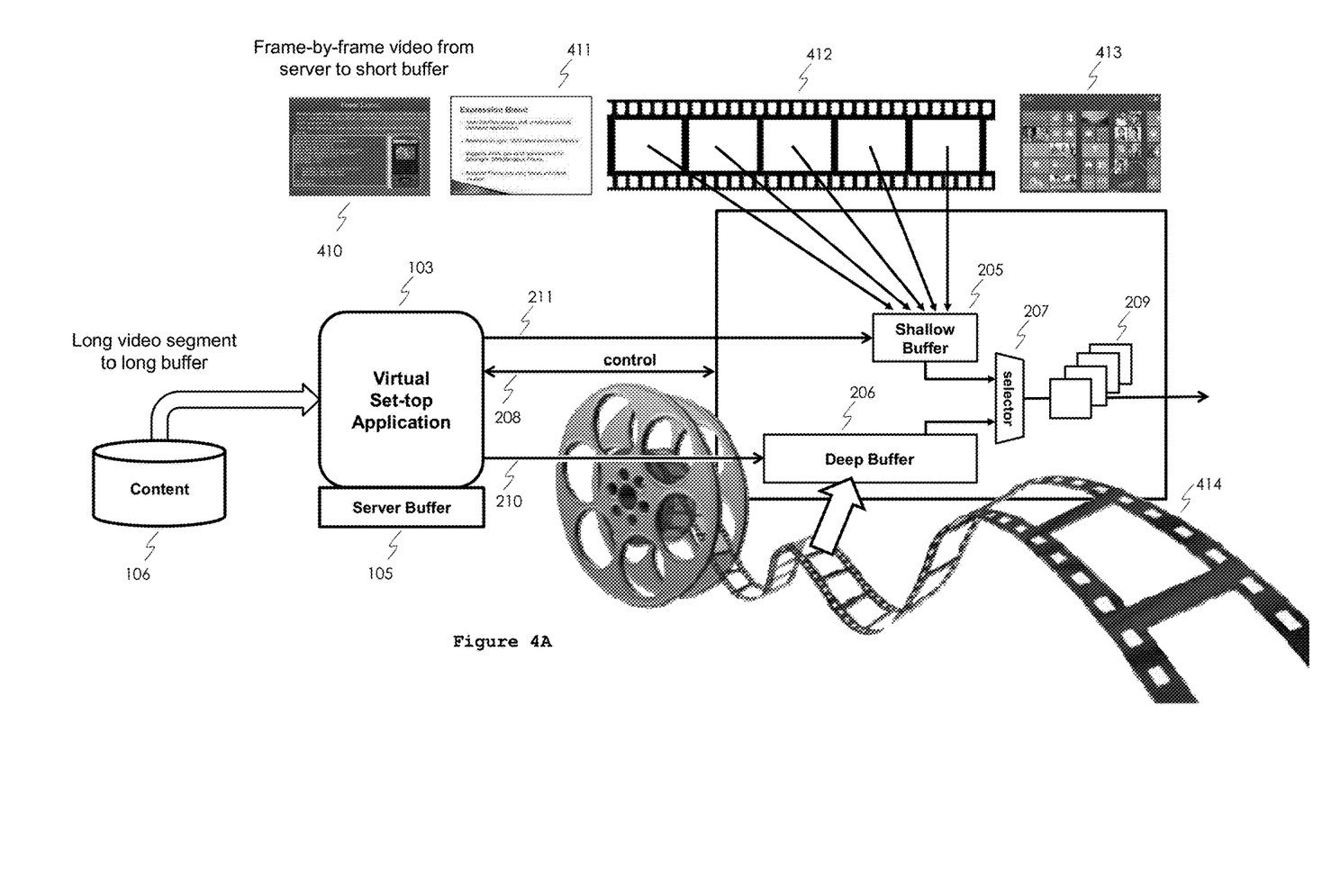
FIG. 4A is another block diagram depicting operation of the system of FIG. 1 in accordance with some embodiments.

FIG. 4A is another block diagram depicting operation of the system of FIG. 1 in accordance with some embodiments. In FIG. 4A, content 106 is delivered to a virtual set-top application 103 running on the server 102 (e.g., located at the system headend). For simplicity, only one instance of a virtual set-top application 103 and one instance of a client-device application 104 are depicted. The virtual set-top application 103 sends a mix of still-frame images 410, 411 and 413 and short video elements 412 to the shallow buffer 205. (Both the still-frame images 410, 411 and 413 and short video elements 412 are examples of user-interface elements.) The same instance of the virtual set-top application 103 stores a longer video segment 414 (e.g., a continuous video) in the deep buffer 206. In some embodiments, the virtual set-top application 103 sends the still-frame images and interface components 410, 411 and 413 and/or short video elements 412 simultaneously with the video segment 414 over distinct connections 211 and 210.

Figure 4B:
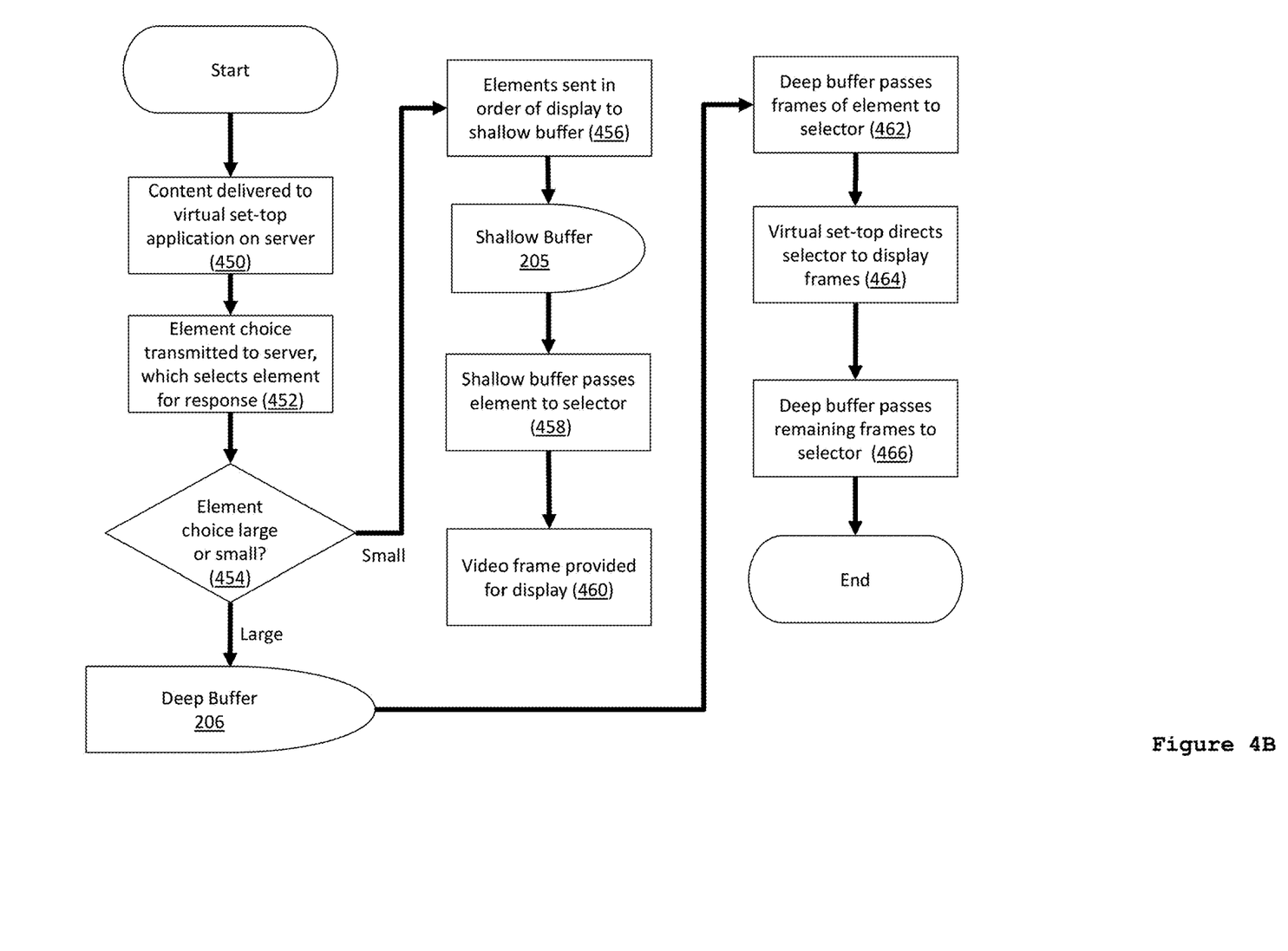
FIG. 4B is a flowchart of a method of operating the system of FIG. 4A in accordance with some embodiments.

FIG. 4B is a flowchart of a method of operating the system of FIG. 4A in accordance with some embodiments. In the method of FIG. 4B, content is delivered (450) to a virtual set-top application 103 on the server 102. For example, content is stored in the server buffer 105 or database 107, which are accessible to the virtual set-top application 103. A user chooses a user-interface element (e.g., on a menu displayed by a corresponding client device). The choice is transmitted (452) to the virtual set-top application 103, which selects a corresponding user-interface element. The virtual set-top application 103 determines (454) whether the selected element satisfies a size threshold (e.g., whether it is large or small). If it satisfies the threshold, the virtual set-top application 103 sends it to the deep buffer 206. If it does not satisfy the threshold, the virtual set-top application 103 sends it (456), in order of display with other user-interface elements, to the shallow buffer 205.

If the selected user-interface element is sent to the shallow buffer 205, the shallow buffer 205 passes it (458) to the buffer selector 207, and a corresponding video frame is provided (460) for display. If the selected user-interface element is sent to the deep buffer 206, the deep buffer 206 passes (462) frames of the element to the buffer selector 207. The virtual set-top application 103 directs (464) the buffer selector 207 to provide the frames for display. The deep buffer 206 passes (466) remaining frames to the buffer selector 207 for display as well.

Figure 5A:
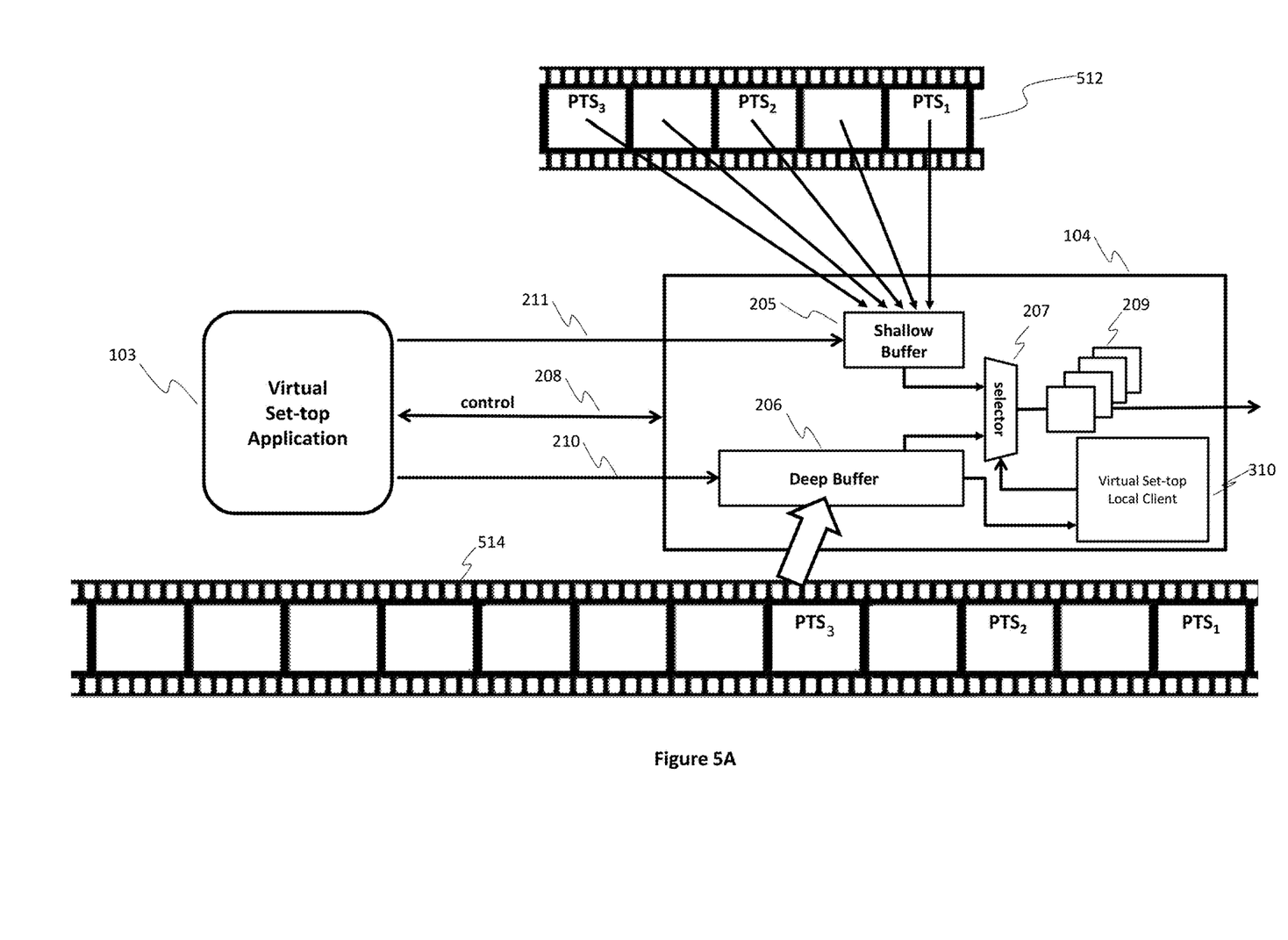
FIG. 5A is yet another block diagram depicting operation of the system of FIG. 1 in accordance with some embodiments.

FIG. 5A is yet another block diagram depicting operation of the system of FIG. 1 in accordance with some embodiments. For simplicity, only one instance of a virtual set-top application 103 and one instance of a client-device application 104 are depicted. The virtual set-top application 103 sends a long video segment 514 to the deep buffer 206 as one transmission and simultaneously sends a corresponding video segment 512 frame-by-frame to the shallow buffer 205. The segment 512 is identical to a portion (e.g., an initial portion) of the segment 514 and is produced by the virtual set-top application 103 from the video segment 514. In some embodiments, the video segment 514 is received from the content source 106 (FIGS. 1, 2, 4A). The processor overhead to send individual frames of the segment 512 to the shallow buffer 205 is high and is only intended to be for a short duration, while the processing overhead to send the long video segment 514 to the deep buffer 206 is low. Sending of individual frames to the shallow buffer 205 is thus only performed for a short duration until the deep buffer 206 fills, while the deep buffer 206 is the ultimate destination for the bulk of the video stream that corresponds to the segments 512 and 514. Controlled by the virtual set-top application 103, the server 102 sends frames to the shallow buffer 205 until the video segment 514 makes its way through the deep buffer 206 and begins to emerge from the output of the deep buffer 206. At that point, the server 102 stops sending frames to the shallow buffer 205 and the buffer selector 207 switches from selecting the shallow buffer 205 to selecting the deep buffer 206. This use of the shallow buffer 205 while the deep buffer 206 fills significantly reduces (e.g., essentially eliminates any) perceptual latency to the user regarding the start of the requested video sequence.

In some embodiments, the video segment 512 in the shallow buffer 205 is synchronized with the video segment 514 in the deep buffer 206 using program time stamps (PTSs). For example, each group of pictures (GOP), defined for example with I-frame boundaries, has a distinct timestamp. This synchronization allows the buffer selector 207 to switch between the shallow buffer 205 and deep buffer 206 without causing any delay or interruption in the presentation of video.

Figure 5B:
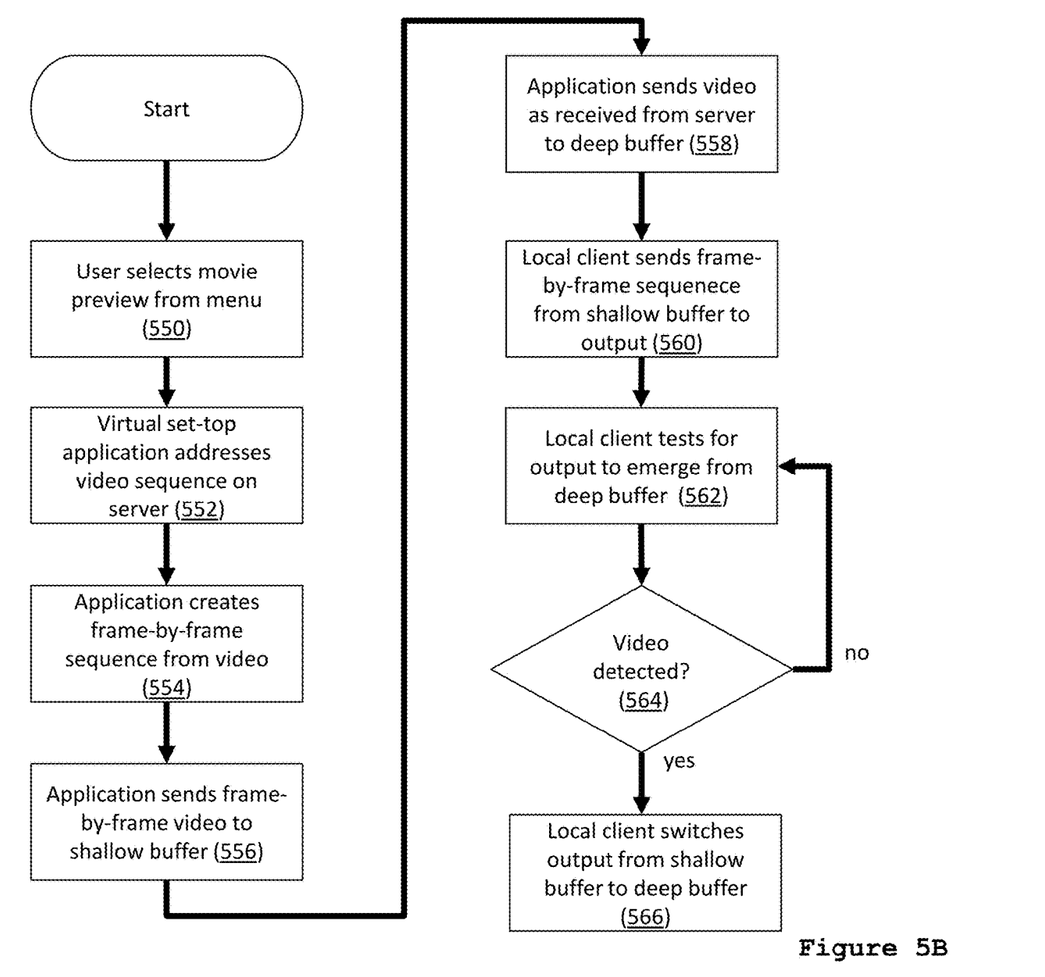
FIG. 5B is a flowchart of a method of operating the system of FIG. 5A in accordance with some embodiments.

FIG. 5B is a flowchart of a method of operating the system of FIG. 5A in accordance with some embodiments. In the method of FIG. 5B, a user of a client device selects (550) a movie preview (or other multi-frame video) from a menu. The virtual set-top application 103 addresses (552) a corresponding video sequence from a server (e.g., from the CDN 101, or from the server buffer 105) and creates (554) a frame-by-frame sequence from the addressed video sequence. The virtual set-top application 103 sends (556) the frame-by-frame sequence (e.g., sends frames individually) to the shallow buffer 205 and also sends (558) video as received from the server to the deep buffer 206 (e.g., in a block of multiple frames, as opposed to individually). The virtual set-top local client 310 outputs (560) frames of the frame-by-frame sequence from the shallow buffer 205. While doing so, the virtual set-top local client 310 also tests (i.e., checks) (562) for output emerging from the deep buffer 206. If no output is emerging yet (564-No) from the deep buffer 206 (e.g., because the deep buffer 206 is not yet sufficiently full), the virtual set-top local client 310 continues to output (560) frames from the shallow buffer 205. Once video is detected emerging from the deep buffer 206 (564—Yes), the virtual set-top local client 310 uses the buffer selector 207 to switch (566) from the shallow buffer 205 to the deep buffer 206 and outputs frames from the deep buffer 206.

Thus, in the method of FIG. 5B, a video segment simultaneously enters both the deep buffer 206 and the shallow buffer 205 from the host server 102. The overhead to send individual frames to the shallow buffer 205 is high. The overhead to send the bulk video segment to the deep buffer 206 is low. The server 102 continues to stuff frames into the shallow buffer 205 until the deep buffer 206 fills enough to take over. In some embodiments, switching from the shallow buffer 205 to the deep buffer 206 is not performed until the deep buffer 206 is sufficiently full (i.e., satisfies a fullness criterion) to smooth out network-congestion irregularities.

Figure 6A:
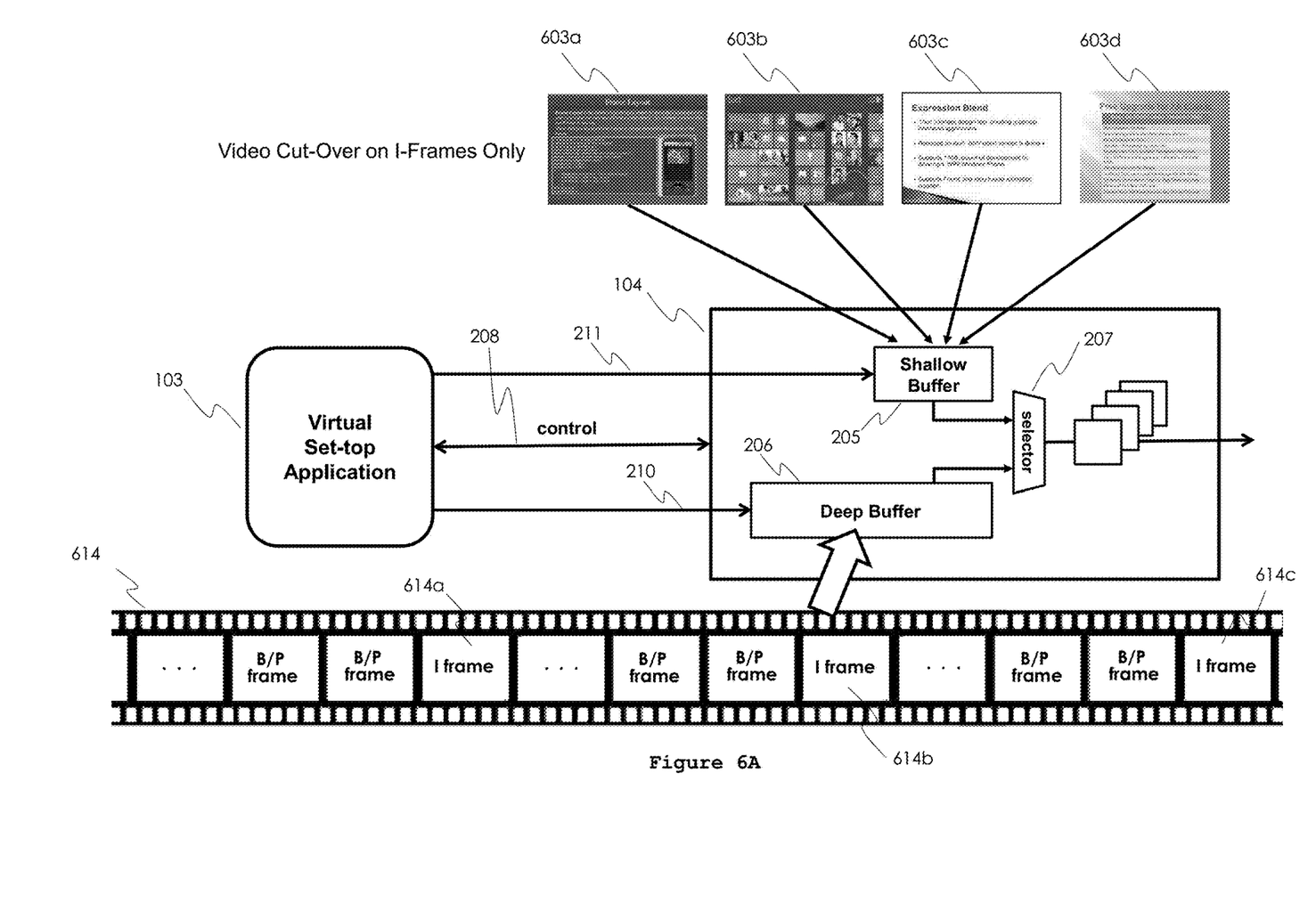
FIG. 6A is still another block diagram depicting operation of the system of FIG. 1 in accordance with some embodiments.

FIG. 6A is still another block diagram depicting operation of the system of FIG. 1 in accordance with some embodiments. The shallow buffer 205 receives still-frame user-interface elements (e.g., graphical elements) 603a-603d from the virtual set-top application 103. The virtual set-top application 103 also sends multi-frame video segments 614 to the deep buffer 206. Under the control of the virtual set-top application 103, the buffer selector 207 may insert any still-frame element 603a to 603d (or alternatively, a frame of a short video clip) from the shallow buffer 205 in place of any I-frame (i.e., intra-coded frame) 614a-614c from the video segment 614 emerging from the deep buffer 206 for display. Any still-frame graphic 603a to 603d can also be switched from the short buffer to the long buffer to any I-frame such as 614a to 614c. A mix of still-frame graphics, short video clips, and/or long video clips can thus be assembled on-command to efficiently produce a smooth integration of complex user interface elements. Switching between the shallow buffer 205 and deep buffer 206 may occur on I-frames in the video segment 614 but not on P-frames and B-frames (i.e., on inter-coded frames) in the video segment 614, in accordance with some embodiments.

Figure 6B:
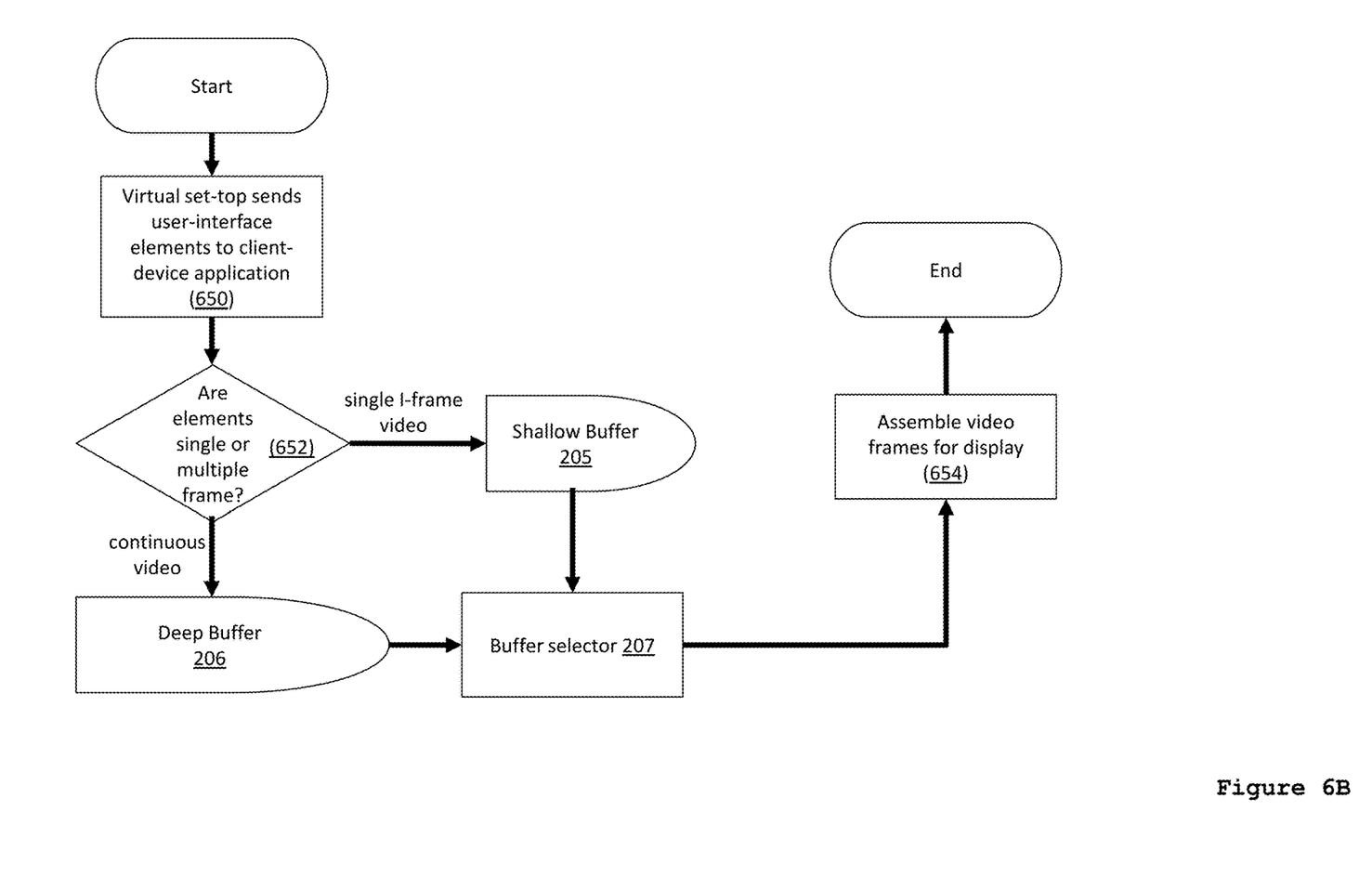
FIG. 6B is a flowchart of a method of operating the system of FIG. 6A in accordance with some embodiments.

FIG. 6B is a flowchart of a method of operating the system of FIG. 6A in accordance with some embodiments. In the method of FIG. 6B, a virtual set-top application 103 sends (650) user-interface elements to the client-device application 104. To do so, the virtual set-top application 103 determines (652) whether respective elements are single-frame or multiple-frame. If a user-interface element is a single frame (e.g., single I-frame video), it is sent to the shallow buffer 205. If a user interface element has multiple frames (e.g., continuous video), it is sent to the deep buffer 206. The buffer selector 207 selects between the shallow buffer 205 and deep buffer 206. The virtual set-top local client 310 assembles (654) video frames for display, using the output of the selected buffer.

As can be seen by the examples above, the combined use of deep and shallow buffers provides multiple ways to combine various user-interface elements in such a manner that screens of an interactive television application can be presented to the user with low latency regardless of the type of interface asset from any element, class, or type of interface object. Examples of such interface elements include, but are not limited to, short video elements, still graphic frames, individual user-interface graphics, text, and full-motion video. The result is a responsive user experience for a user interacting with a potentially complex software application hosted at a remote location via a client device (e.g., set-top box) that may be of low complexity (i.e., a "thin client") regardless of the complexity of the remote ITV application.

The functionality described herein may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising, at a client device:
    receiving, from a server, first content that includes a first set of packets of video data directed to a first buffer in the client device, wherein the first content comprises a video segment of the first set of packets of video data;
    receiving, from the server, second content directed to a second buffer in the client device, wherein:
        the second content includes a second set of packets of video data,
        the second set of packets of video data includes the first set of packets of the video data,
        the second content includes an initial set of packets of video data of the video segment, and
        the second buffer is deeper than the first buffer;
    buffering the first content in the first buffer;
    buffering the second content in the second buffer, wherein at least a portion of the second content is buffered in the second buffer substantially simultaneously with buffering the first content in the first buffer;
    selecting the first buffer as a content source before output emerges from the second buffer;
    detecting whether the second buffer satisfies a fullness criterion;
    in accordance with a determination that the second buffer satisfies the fullness criterion, switching from selecting the first buffer having the first content that includes the first set of packets of video data as the content source to selecting the second buffer having the second content that includes the first set of packets of the video data as the content source; and
    providing the selected content for display.

2. The method of claim 1, wherein the server is an interactive-television server and the client device is a set-top box.

3. The method of claim 1, wherein the first buffer and the second buffer comprise distinct first-in, first-out (FIFO) queues.

4. The method of claim 1, wherein a depth of the second buffer is at least ten times greater than a depth of the first buffer.

5. The method of claim 1, wherein the selecting comprises multiplexing outputs of the first and second buffers using a buffer selector.

6. The method of claim 1, further comprising, at the client device, receiving commands from the server;
    wherein the selecting is performed in accordance with the commands.

7. The method of claim 6, wherein:
    the commands are received from a virtual set-top application, running on the server, that corresponds to the client device;
    the method further comprises, at the client device, running a virtual set-top local client that receives the commands from the virtual set-top application; and
    the virtual set-top local client performs the selecting.

8. The method of claim 1, wherein:
    the first content comprises a still-frame user-interface element; and
    the second content comprises multi-frame video.

9. The method of claim 8, further comprising, at the client device:
    receiving a user input corresponding to the still-frame user-interface element; and
    in response to the user input, send a command to the server requesting the still-frame user-interface element;
    wherein:
    the still-frame user-interface element is received from the server in response to the command; and
    the selecting the first buffer as the content source comprises selecting the first buffer as a content source when the still-frame user-interface element is available in the first buffer.

10. The method of claim 8, wherein the still-frame user-interface element comprises a menu-item graphic.

11. The method of claim 1, wherein:
the first content comprises a video segment corresponding to a video program; and
the second content comprises a preview of the video program.

12. The method of claim 1, wherein:
receiving and buffering the first content comprise receiving and buffering individually transmitted frames; and
receiving and buffering the second content comprise receiving and buffering a single transmission of multiple frames.

13. The method of claim 1, wherein switching from selection of the first buffer as the content source to selection of the second buffer as the content source comprises switching on an I-frame of the video segment;
wherein switching from selection of the first buffer as the content source to selection of the second buffer as the content source is suppressed on frames that are not I-frames.

14. The method of claim 1, further comprising synchronizing the first content and the second content using program time stamps.

15. The method of claim 1, wherein:
receiving the second content comprises receiving a damaged packet;
buffering the second content comprises buffering the damaged packet in the second buffer;
receiving the first content comprises receiving an undamaged replacement packet for the damaged packet;
buffering the first content comprises buffering the undamaged replacement packet in the first buffer; and
the method further comprises swapping out the damaged packet with the undamaged replacement packet when the damaged packet emerges from the second buffer.

16. A client device, comprising:
one or more processors; and
memory storing one or more programs for execution by the one or more processors, the one or more programs including instructions for:
receiving, from a server, first content that includes a first set of packets of video data directed to a first buffer in the client device, wherein the first content comprises a video segment of the first set of packets of video data;
receiving, from the server, second content directed to a second buffer in the client device, wherein:
the second content includes a second set of packets of video data,
the second set of packets of video data includes the first set of packets of the video data,
the second content includes an initial set of packets of video data of the video segment, and
the second buffer is deeper than the first buffer;
buffering the first content in the first buffer;
buffering the second content in the second buffer, wherein at least a portion of the second content is buffered in the second buffer substantially simultaneously with buffering the first content in the first buffer;
selecting the first buffer as a content source before output emerges from the second buffer;
detecting whether the second buffer satisfies a fullness criterion;
in accordance with a determination that the second buffer satisfies the fullness criterion, switching from selecting the first buffer having the first content that includes the first set of packets of video data as the content source to selecting the second buffer having the second content that includes the first set of packets of the video data as the content source; and
providing the selected content for display.

17. A non-transitory computer-readable storage medium, storing one or more programs configured for execution by one or more processors of a client device, the one or more programs including instructions for:
receiving, from a server, first content that includes a first set of packets of video data directed to a first buffer in the client device, wherein the first content comprises a video segment of the first set of packets of video data;
receiving, from the server, second content directed to a second buffer in the client device, wherein:
the second content includes a second set of packets of video data,
the second set of packets of video data includes the first set of packets of the video data,
the second content includes an initial set of packets of video data of the video segment, and
the second buffer is deeper than the first buffer;
buffering the first content in the first buffer;
buffering the second content in the second buffer, wherein at least a portion of the second content is buffered in the second buffer substantially simultaneously with buffering the first content in the first buffer;
selecting the first buffer as a content source before output emerges from the second buffer;
detecting whether the second buffer satisfies a fullness criterion;
in accordance with a determination that the second buffer satisfies the fullness criterion, switching from selecting the first buffer having the first content that includes the first set of packets of video data as the content source to selecting the second buffer having the second content that includes the first set of packets of the video data as the content source; and
providing the selected content for display.

18. The method of claim 1, wherein the content selected from the first buffer is displayed with a lower latency than the content selected from the second buffer.

* * * * *